Patented Oct. 18, 1949

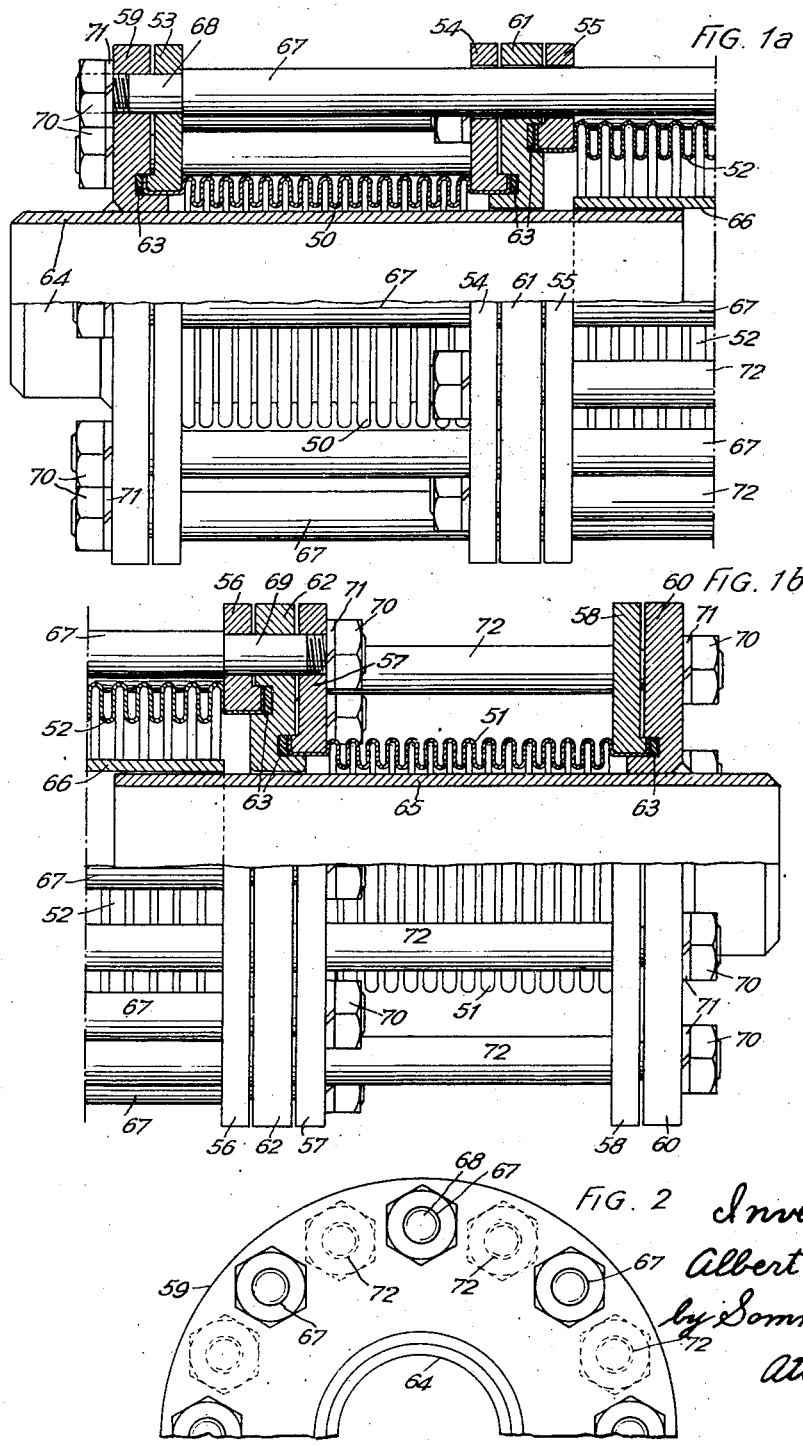

2,485,370

UNITED STATES PATENT OFFICE 2,485,370

PRESSURE-BALANCED PIPE-EXPANSION JOINT

Albert Dreyer, Lucerne, Switzerland

Application June 26, 1946, Serial No. 679,433
In Switzerland October 8, 1945

2 Claims. (Cl. 285—162)

My present invention relates to improvements in pipe expansion joints of the relieved, unloaded or pressure-balanced type, which operate altogether independently of the line pressure, and comprise three axially adjacent chambers closed to the outside by a corrugated tube each, the intermediate being of a greater outside diameter than the two end chambers, and the walls of the said chambers being adapted to be so displaceable relative to each other that upon axially compressing the terminal walls of the end chambers, the latter are shortened, while the length of the intermediate chamber is correspondingly increased, and that—vice versa—upon expanding the said terminal walls, the end chambers are lengthened, while the intermediate chamber is correspondingly shortened.

In prior designs of expansion joints of the character indicated, two inside sleeves are provided for, which engage each other telescope-like by means of slots and lugs, two chamber walls each being secured to the said sleeves. The sleeves consist of seamless drawn or welded tubes or tubes worked from the full. Such latter design, however, requires much time for manufacture and is very expensive, and does not guarantee that no stresses exist in the lugs cut out from the sleeves. In seamless and welded tubes such stresses always are present so that the cut-out tube lugs spring apart or become twisted and thus render the fitting of flanges and rings very difficult. In welding on the chamber walls further stresses arise, in the pipe as well as in the walls, so that a smooth interengagement of the parts is very difficult to attain. Tests made with other types of connection such as, e. g., riveted or screwed did not produce any satisfactory results, partly on account of insufficient strength and partly on account of a lack of space inside the corrugated tube sections. A further disadvantage of such prior design is that only the corrugated end sections, but not the intermediate one, are guided so as not to buckle laterally under pressure.

The relieved pipe expansion joint according to my present invention, now, is distinguished from prior designs of the character indicated insofar as the two terminal walls of the outer chambers are connected to the intermediate walls on the opposite side by means of tie rods or bolts disposed outside of the corrugated tube sections. This feature affords a very easy and simple assembly, a substantial saving in cost, and an increased operative safety and reliability. By means of such outside tie rods, the intermediate corrugated tube section may be so guided as to render a lateral buckling thereof impossible. These rods furthermore enclose all three corrugated tube sections cage-like and protect same against damages in transport and shipment and also in operation. The expansion joint according to the present invention is easily assembled and taken down.

One embodiment of the invention is shown, by way of an example, in the accompanying drawing, in which—

Figs. 1a and 1b, forming one, show the joint partly in lateral view and partly in axial section; and Fig. 2 is a partial front elevation.

The joint comprises two outer corrugated tubes 50, 51 of the same diameter, clear width, length and number of corrugations, and an intermediate corrugated tube 52 of the same active length as the outer ones, but with an active surface of double the area of each outer tube. This means that the active surface of the central tube is exactly as large as the active surfaces of the two sections 50 and 51 together.

Loose or swivel flanges 53—58 are engaged in the rolled or peened ends of the three corrugated tubes 50–52, and are sealed against two outer anchor rings 59, 60 and two intermediate anchor rings 61 and 62 by tongue and groove and gaskets 63.

The two outer anchor rings 59, 60 are fastly secured, e. g. welded to two guide tubes 64, 65. The two intermediate anchor rings 61, 62 swivel and slide on the tubes 64, 65, and an intermediate sleeve 66 is a loose fit on the latter.

The terminal outer wall of the left-hand outer chamber, formed by the anchor ring 59 and the swivel flange 53, is connected to the right-hand intermediate wall, formed by the anchor ring 62 and the swivel flanges 56 and 57, by means of tie rods or bolts 67 which pass through the left-hand intermediate wall formed by the anchor ring 61 and the flanges 54 and 55. The said bolts or rods 67 at both ends are provided with shouldered and threaded portions 68 and 69 engaged by nuts 70 which are secured by spring washers 71. By means of the said portions 68 of the rods 67, the flange 53 is simultaneously connected with the anchor ring 59, and by means of the end portions 69, the flanges 56 and 57 with the anchor ring 62. In the same way, the end wall of the right-hand outer chamber, formed by the anchor ring 60 and the flange 58, is connected to the left-hand end wall of the intermediate chamber, formed by the ring 61 and the flanges 54 and 55, by means of the tie rods 72 with shouldered and threaded end portions which also are engaged by nuts 70 secured by spring washers 71. By the right-hand end portions of the rods 72, at the same time, the flange 58 is secured to the anchor ring 60, and by their left-hand end portions the flanges 54 with the ring 61. The two intermediate end walls may slide on the rods 67 and 72 respectively passing therethrough, and the slide faces may be lubricated if desired. As seen from the drawing, the rods 67 and 72 alternate over the circumference of the expansion joint and are equally spaced.

By virtue of such connection of the end walls by means of stay bolts or tie rods 67 and 72, the two outer corrugated tubes 50 and 51 are shortened upon axially compressing the expansion joint, and the intermediate corrugated tube 52 is axially expanded. Vice-versa, the two outer corrugated tubes 50 and 51 are axially expanded, and the intermediate corrugated tube 52 shortened upon axially expanding the expansion joint.

The pipe joint shown permits, e. g., a compression over a distance of 15 mm. from its neutral position, and an elongation of 15 mm. also, i. e. a total travel, stroke or throw of 30 mm. Upon connecting same to a cold pipe line, it suitably is mounted under an initial tension, i. e. expanded for half of its total travel. When the line warms up and expands, the two outer end walls of the joint may be moved toward each other over a distance of 30 mm.

In the unloaded or relieved state, the inner end walls of the two guide tubes 64 and 65 are separated from each other for a distance corresponding to half of the total travel. In the compressed state of the joint, the said inner ends of the tubes 64 and 65 abut against each other and thus limit the stroke, so that the corrugated tubes 50 and 51 cannot be brought, nor the intermediate corrugated tube 52 expanded beyond the permissible distance. The intermediate tube 66, furthermore, which slides loosely on the inner ends of the tubes 64 and 65, is made of such length as to limit the expansion of the joint. When the two outer corrugated tubes 50 and 51 are expanded, by drawing apart the joint, the intermediate corrugated tube 52 at the same time is correspondingly shortened, until the anchor rings 61 and 62 abut against the ends of the tubes 66.

The outer ends of the two guide tubes 64 and 65 are adapted to be directly welded into the existing pipe line. The expansion joint described, however, also could be built into the existing pipe line in some other customary way and manner, e. g. by screwing or by means of flanges.

The two tubes 64 and 65 afford a minimum of friction loss for the medium passing therethrough, and prevent the formation of noise. They furthermore protect the corrugated tubes against the ingress of foreign matter which otherwise would impair the correct functioning of the pipe expansion joint.

The corrugated tubes 50, 51 and 52 may be made of pinchbeck, bronze, stainless steel or some other suitable material, and may be of the single-wall or multiple-wall types.

In place of connecting the corrugated tubes with the flanges by peening, such connection also could be made by welding. When compressing the joint described, only the resistance proper of the corrugated tubes themselves has to be overcome, whilst the line pressure is fully balanced. When, e. g., the joint described is fastly closed at one end, and connected at the other end to a line so as to permit of setting the joint under pressure, the joint will neither expand nor contract, irrespective of the size of the pressure. Such a joint of 40 mm. clear diameter is built up, e. g., of triple-walled corrugated tubes made of stainless steel, has an overall structural length of 300 mm., and is designed for a total travel or throw of 30 mm. A load of only 40 kgs. is sufficient for axially pressing the joint together over a distance of 15 mm. When this joint is subjected to an inside pressure of 50 atm., it requires a load of only 40 kg. just the same, in order to press it together over a distance of 15 mm. Approximately the same load is required to elongate the joint from its neutral position over a distance of 15 mm., irrespective of the inside pressure, be that now nil or 50 atm. This fact proves that the design and construction described affords a complete pressure-balance, and that the initial tension, under which the joint is to be built into a pipe line, is not great.

If, in the place of such a balanced expansion joint, only a simple corrugated tube of the same active area were built into the pipe line, it would require an axial load of only 15 kgs., i. e., only about one third of that of the present joint, to press it together axially, provided that it be not exposed to a pressure, but a force of about 1250 kgs. when subjected to a pressure of 50 atm. Whereas, therefore, when employing such a non-relieved joint of the size mentioned, the anchor point of the pipe line is subjected to a pressure of 1250 kgs., the said pressure is practically nil when using a joint affording a complete pressure-balance.

In present-day pipe construction, operating pressures of 50 atm. are nothing extraordinary, even for pipes of large cross-section. With an increase of the clear diameters, the pressure on the anchor points are increased enormously. In the case of a clear diameter of 200 mm. and 50 atm. pressure, e. g., the pressure upon the anchor point amounts to 19,000 kgs. when using a common corrugated-tube expansion joint or a stuffing-box compensator. In many cases, e. g. in turbine construction and in ship-building, the anchor points cannot always be built with the requisite or desired strength, so that the use of compensators is indispensable, and the demand for fully relieved compensators or expansion joints is getting greater and greater.

By using multi-walled corrugated tubes, axially acting pipe expansion joints affording a perfect pressure-balance may be made for all normally arising operating pressures according to the construction shown and described, the resistance of the joint itself being kept within altogether permissible and relatively very low limits even in the case of large diameters.

What I claim and desire to secure by Letters Patent is:

1. A pressure-balanced axially acting pipe expansion joint of the class described comprising two pipe lengths of pipe-line diameter, an intermediate short tube mounted loose on the inner ends of the said pipe lengths, a flange each fastly secured to the outer ends of the latter, a loose flange each disposed on the said pipe lengths near the ends of the said intermediate tube, a corrugated tube each mounted on the said pipe lengths, a corrugated tube mounted on the said intermediate tube and affording an active area equal to that of the other two corrugated tubes combined, the said corrugated tubes forming adjacent intercommunicating chambers subjected to the line pressure and axially defined by the said flanges, a set of flanges to which the ends of the said corrugated tubes respectively are fastly secured and which are located on the said other flanges respectively, and two sets of alternating tie bolts each interconnecting the fast-flange aggregate at the outer end of each external corrugated-tube chamber with the loose-flange aggregate at each end of the intermediate chamber, the two sets of tie bolts alternating with and overlapping each other about the latter upon axial expansion of the joint due to cooling and shortening of the pipe the outer corrugated-tube chambers are extended and the intermediate chamber contracted, and vice-versa upon axial compression of the joint due to heating and lengthening of the pipe.

2. In a pressure-balanced axially acting pipe expansion joint according to claim 1, pipe lengths and intermediate tube so adapted and disposed relative to the loose-flange aggregates adjacent the latter as to limit the operating throw of the joint, and tie bolts passing freely through bores provided in the respective loose-flange aggregate intermediate of the bolt ends.

ALBERT DREYER.

REFERENCES CITED

The following references are of record in the file of this patent:

UNITED STATES PATENTS

| Number | Name | Date |
| --- | --- | --- |
| 1,318,525 | Baldwin | Oct. 14, 1919 |